United States Patent Office.

WILLIAM FIELDS, OF WILMINGTON, DELAWARE.

Letters Patent No. 102,796, dated May 10, 1870.

IMPROVEMENT IN THE MANUFACTURE OF STEEL.

The Schedule referred to in these Letters Patent and making part of the same.

I, WILLIAM FIELDS, of the city of Wilmington, in the State of Delaware, have invented an Improved Process in the Manufacture of Steel, of which the following is a specification.

Nature and Object of the Invention.

The nature of the invention consists in two combinations, or chemical compounds, one of which is thrown into the puddling-furnace with its damper partly closed, and when the iron is in the boiling process. After this compound has incorporated itself with the molten iron the other is thrown into the furnace, and when it is also thoroughly incorporated with the iron, the damper being kept partly closed until the metal is grained and balled, it is then turned out fine steel.

The object of this invention is, by means of the compound first used, to eliminate the sulphur and phosphorus, and produce a neutral iron, and, by means of the second compound, to convert the iron into steel.

General Description.

I charge the puddling-furnace with four hundred and fifty pounds of any two or three kinds of pig-iron, thirty-five pounds of Franklinite iron, and forty pounds of Canada iron ore, and, when the iron is undergoing the puddling or boiling process, I cast into the furnace a chemical compound, thoroughly mixed, composed of the following ingredients, to wit: one pound of English sal-soda, ten ounces of sal-ammoniac, and one ounce of magnesia. I allow this compound to become thoroughly incorporated with the iron, so as to produce what is termed neutral iron. Then, still keeping the damper partly closed, I cast into the furnace another compound, composed of the following ingredients, that is to say, eight ounces of wolfram, five pounds of chromate of iron, one-half ounce of silver, one-quarter ounce of platinum, two ounces of rhodium, one-half ounce of iridium, one-half ounce of osmium, eight ounces of manganese, and one gallon of pulverized charcoal. The damper is kept partly closed until ready for graining and balling, when the steel is turned out for hammering or rolling.

I do not claim, broadly, the use of chromate of iron and wolfram in the compound for making steel from cast-iron; nor do I claim the use of Franklinite iron and Canada iron ore, as I am aware that they have been used in the treatment of iron; but

What I claim as my invention is—

1. The employment of magnesia in about the quantity specified, when used for the purposes described.
2. The process of treating iron, during the puddling or boiling process, for the purpose of converting it into steel, with a chemical compound composed of the ingredients hereinbefore first named, in about the quantities specified and prepared, and used in the manner and form described and for the purposes set forth, being the compound first used in the process.
3. The employment of silver in about the quantity specified, when used for the purposes aforesaid.
4. The employment of platinum in about the quantity specified, when used for the purposes set forth.
5. The employment of rhodium in about the quantity specified, when required for the above-named purposes.
6. The employment of wolfram in about the quantity described, when used for the purposes set forth.
7. The employment of iridium in about the quantity specified, for the purposes mentioned.
8. The employment of osmium in about the quantity specified, for the purposes mentioned.
9. The process of treating iron for the purpose of converting it into steel, during the puddling or boiling process, with a chemical compound composed of the ingredients hereinbefore last mentioned, in about the quantities specified, and prepared in the manner and form described and for the purposes set forth, it being the compound used in the latter part of the process.
10. The whole process of treating iron for the purpose aforesaid, as hereinbefore fully set forth and described, and for the purposes mentioned.

WILLIAM FIELDS.

Witnesses:
CHARLES Y. SMITH,
SAMUEL J. BUCK.